United States Patent Office 2,709,702
Patented May 31, 1955

2,709,702
FLUORESCENT AGENTS

William Wilson Williams and Harlan B. Freyermuth, Easton, Pa., assignors to General Aniline & Film Corporation, New York, N. Y., a corporation of Delaware No Drawing. Application October 12, 1951,
Serial No. 251,144

3 Claims. (Cl. 260—309.6)

This invention relates to novel spirit soluble amine salts of 4,5-diphenylimidazolonedisulfonic acid which are of

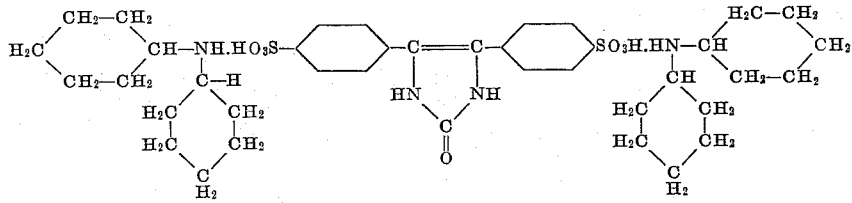

particular value as fluorescent brightening agents for lacquers, shellac and plastics, particularly vinyl type plastics.

The novel compounds of the present invention are, as stated, spirit soluble, i. e., soluble in a wide variety of volatile organic solvents such as methanol, ethanol, acetone, methylethylketone, low boiling hydrocarbons (petroleum ether and benzene) esters (ethyl acetate, butyl acetate) etc., and it may, therefore, readily be incorporated in such compounds as lacquers, shellac and many vinyl type plastics. These compounds fluoresce in the presence of ultra violet light with a blue fluorescence so that when a minor amount thereof is incorporated in lacquer or vinyl type plastic which is nearly colorless, the blue fluorescence of the compound neutralizes any slight yellowishness of the material of which they are incorporated with the result that the material containing them is much whiter or brighter in appearance. They are also useful as ultraviolet light filters in lacquers, shellac, or vinyl type plastics.

The preparation of the compounds of the present invention will be apparent from the following specific examples:

Example 1

50 parts of 4,5-diphenylimidazolonedisulfonic acid was dissolved in 150 parts water in a 1-liter beaker and heated to 60–70° C. 3 parts of activated charcoal (Nuchar) was added and after stirring for about 5 minutes, the mixture was filtered through a small Buchner funnel. The charcoal cake was washed with about 50 parts of water. The filtrate (pH 0.5) was titrated to pH 11.0 with 16.9 parts cyclohexylamine in a 1-liter beaker with continual stirring. The product precipitated out at about the neutral point. The pH was adjusted to 5–6 with a few cc. of glacial acetic acid. The product was filtered on a Buchner funnel and the cake was washed with 50 parts of water. The product was dried in a vacuum oven at 60–65° C. Yield: 42 parts. This product had the formula

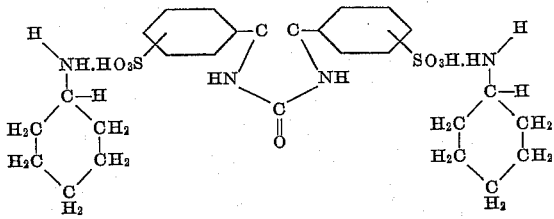

Example 2

22 parts of sodium 4,5-diphenylimidazolone disulfonate was dissolved in 500 parts of water in a two-liter beaker by heating to 50–55° C. To this solution was added a solution of 55 parts of dicyclohexylamine, 500 parts of water and 91 parts of concentrated sulfuric acid (specific gravity 1.84). The white crystalline salt precipitated immediately. The mixture was stirred for one-half hour and the product was filtered on a Buchner. The product was washed with 300 parts of water and then dried in a vacuum oven at 85° C. Yield: 32.7 parts. This product had the formula:

Both of the above products were soluble in ethanol and the solution had a brilliant blue fluorescence under ultraviolet light. They were also soluble in acetone but did not fluoresce in this solvent. They were also soluble in methanol, mineral spirits, benzene, acetone and ethyl acetate but did not fluoresce in ethyl acetate.

Each of the compounds prepared above were incorporated in solutions (lacquers) in volatile solvents of nitrocellulose, cellulose acetate, ethyl cellulose methyl methylacrylate, vinyl chloride-vinyl acetate copolymer lacquer and shellac so that there was present 0.3% by weight of the fluorescent compounds based on the solids content of the solutions. The thus obtained solutions were opaque white and did not fluoresce in daylight but had considerable greenish blue fluorescence under ultraviolet light. These solutions were coated on sized paper and it was found that in each case the coating from the lacquers containing the fluorescent agents of the present invention were much whiter in appearance than the coatings obtained from similar solutions which contained no fluorescent agent. It was also found that the fluorescent agents of the present invention were resistant to fading under ultraviolet light and the coatings from the above solutions containing these fluorescent agents showed much less fading under ultraviolet light when exposed in a fadometer than did coatings from like solutions containing other fluorescent agents which were exposed along with them.

While the cyclohexyl amine salts and dicyclohexylamine salts of the 4,5-diphenylimidazolonedisulfonic acid are particularly preferred fluorescent agents of the present invention, it has been found that other amine salts of 4,5-diphenylimidazolonedisulfonic acid possess substantially similar properties and may be used, if desired. Such salts are the primary and secondary aliphatic amine salts obtained from primary and secondary aliphatic amines containing at least 8 carbon atoms such as dibutyl amine, diamyl amine, octyl amine and dioctyl amine. Also the di-o-tolylguanidine salts are substantially equivalent to the cyclohexylamine salts specifically described above.

We claim:
1. Compounds of the formula

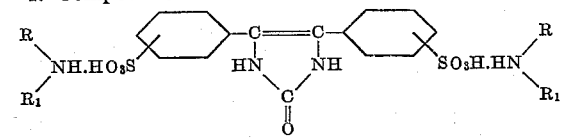

wherein the groups

represent an amino radical selected from the group consisting of mono- and dicyclohexylamino radicals, mono- and di-alkylamino radicals containing 8 to 16 alkyl carbon atoms, and di-o-tolylguanidino.

2. The cyclohexylamine salt of 4,5-diphenylimidazolone disulfonic acid.

3. The dicyclohexylamine salt of 4,5-diphenylimidazolone disulfonic acid.

References Cited in the file of this patent

UNITED STATES PATENTS 2,580,234   Lecher _____ Dec. 25, 1951

FOREIGN PATENTS 735,478   Germany _____ May 18, 1943